April 4, 1939.  W. L. MacRAE  2,153,424
POSITION INDICATOR FOR MACHINE TOOLS
Filed Oct. 7, 1937
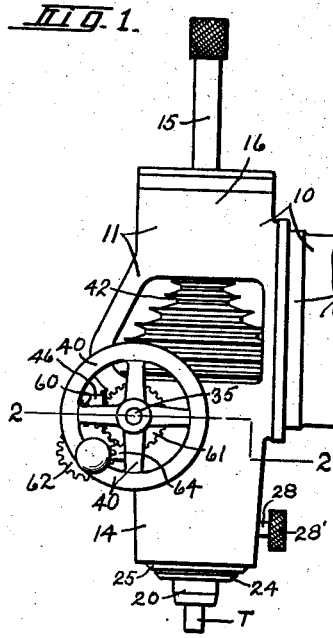
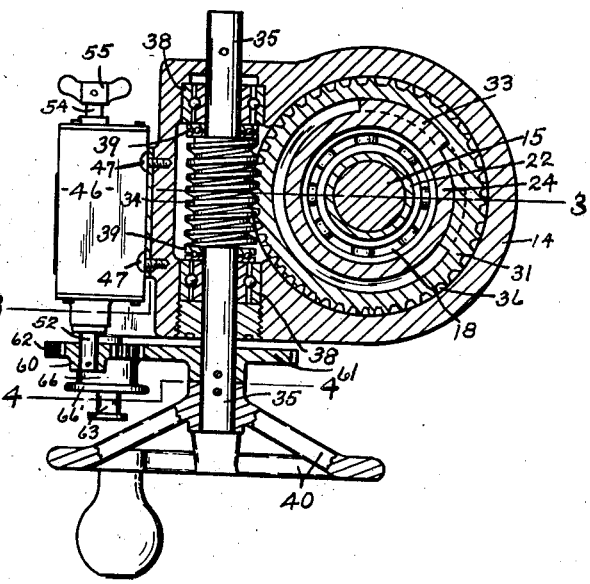
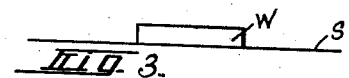
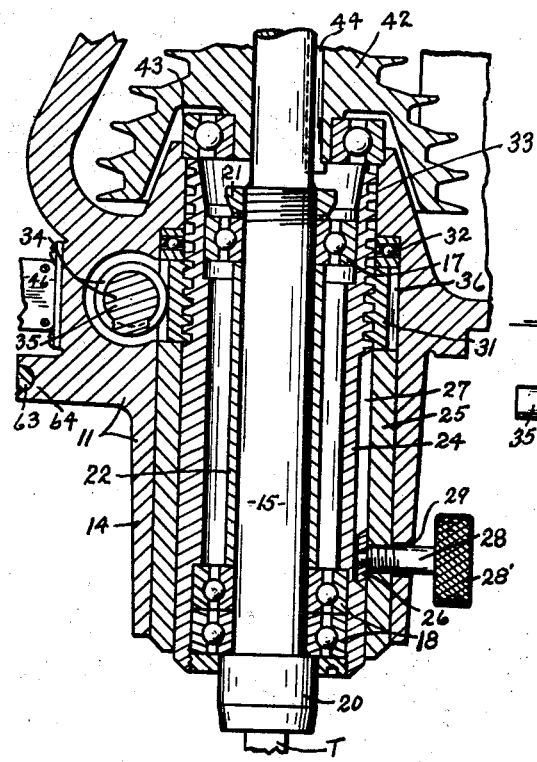
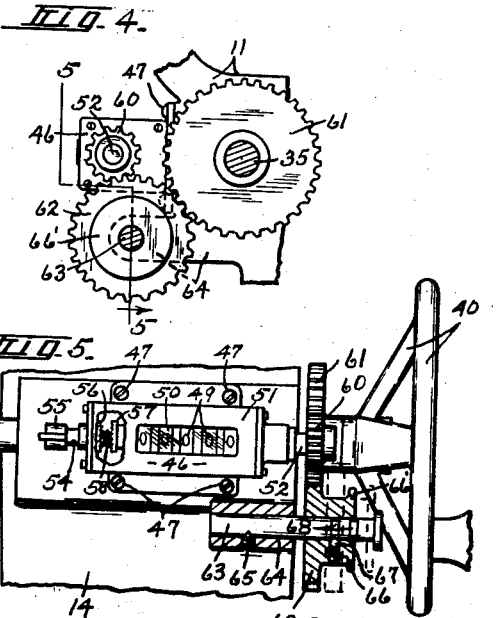
INVENTOR
WILLIAM L. MacRAE
BY
Simonton & Thomson
ATTORNEYS Patented Apr. 4, 1939

2,153,424

UNITED STATES PATENT OFFICE 2,153,424

POSITION INDICATOR FOR MACHINE TOOLS

William L. MacRae, Syracuse, N. Y., assignor to Dalrae Tools Company, Syracuse, N. Y., a partnership composed of De Forest Alonzo Lapham and William L. MacRae Application October 7, 1937, Serial No. 167,796

2 Claims. (Cl. 90—16)

This invention relates to a position indicator for machine tools.

In so far as the applicant is aware, machine tool position indicating devices have heretofore comprised either a rotating dial operatively connected with the positioning mechanism for producing relative movement of the tool and work toward each other and which rotates in predetermined relation to said relative movement of the tool and work, or a stop element adjustably connected with the positioning mechanism for positively limiting the relative movement of the tool and work at the desired position of the tool with respect to the work.

When using the dial as a tool positioning indicator, the dial is necessarily limited in diameter owing to the relatively small space available for the dial or to its being impracticable from the stand point of design. This necessitates an appreciable amount of movement of the dial for each fraction of an inch of relative movement of the tool and work toward each other in order that the markings or indicia on the dial may be spaced from each other sufficiently to enable the same to be quickly and easily observed or read by the operator. It therefore follows that the degree of relative movement of the tool and work toward each other is necessarily so limited for each revolution of the dial, the dial usually must rotate from one to two or even more complete revolutions during the said relative movement of the tool and work to bring the tool from the inoperative position in space relation to the work to the operative position with the tool kissing or merely touching the work, that is to say in initial contact therewith. This necessitates the operator observing the number of complete revolutions of the dial or fraction thereof each time the tool is brought into contact with the work and mentally recording such movement of the dial in order for the operator to be able to know the position of the zero mark on the dial as the tool begins its operation on the work. This, of course, requires work and painstaking on the part of the operator which necessarily slows down the operation of the machine and is conducive of mistakes or errors being made in the final position of the tool at the completion of the work being performed.

When using the adjustable stop in conjunction with the positioning mechanism for bringing the tool into operative relation with the work, there is also opportunity for inaccuracy or minute variations occurring in the positioning of the tool due to variation in the amount of pressure produced by the operator on the control lever of the positioning mechanism, which in turn produces variations in the relative movement of the work and tool toward each other by taking up more or less slack in the pivotal connections, bearings, and gearings etc. associated with the positioning mechanism.

The main object of this invention therefore, is to provide a position indicator for machine tools, which will overcome the above mentioned defects found in the conventionally constructed position indicators.

Another object of the invention is to provide a tool positioning indicator whereby the position of the cutting edge of the tool with respect to the work may be readily determined without any process of calculation after the indicator has been set for a given piece of work.

A further object of the invention is to provide a positioning indicator of the class described by which when once set for a particular movement of the tool, the tool may be used indefinitely for that particular operation without again resetting the indicator or observing the amount of relative movement of the tool and work as the tool is moved from the inoperative position in spaced relation to the work to the operative position where the tool contacts with the work at the beginning of the cutting operation thereof.

A still further object of the invention resides in producing a position indicator for machine tools which affords the maximum degree of accuracy and speed in positioning of the tool with respect to the work thereby producing a saving of time and labor and providing for the elimination of errors in the operation of the tool to a maximum degree.

I attain these objects by mechanism illustrated in the accompanying drawing, in which:

Figure 1 is a side elevation of a machine tool mounting having a tool positioning indicator device associated therewith which is constructed in accordance with this invention.

Figure 2 is a horizontal transverse sectional view taken substantially on line 2—2, Figure 1.

Figure 3 is a detail vertical sectional view of the lower end portion of the mounting shown in Figure 1 taken in the plane of the line 3—3, Figure 2.

Figure 4 is a detail vertical sectional view taken on line 4—4, Figure 2.

Figure 5 is a detail vertical sectional view taken on line 5—5, Figure 4 and illustrating the portion of the position indicator broken away.

In order to illustrate the novel feature of this invention, I have shown a portion of a high speed cutting tool mounting adapted to be secured or removably attached to a milling machine or the like having a work supporting table. The mounting, as 10, comprises a housing 11, and a bracket 12 for operatively connecting the housing 11 with a suitable support on the machine with which the mounting is to be used, such as an over-arm, not shown. The housing 11 is a one-piece elongated member forming a case for a tool spindle 15.

The spindle 15 extends longitudinally through the housing 11 with the upper portion thereof normally extending some distance above the housing. The spindle may be mounted in suitable bearings, not shown, provided in the upper end portion 16 of the housing 11 for both rotary and axial movement with respect to the said housing. The lower end portion of the spindle 15 is shown in Figure 3, journaled in suitable bearings 17 and 18 arranged in axial spaced relation to each other between a tool chuck 20 provided on the lower end of the spindle and a nut 21 screw threaded on said spindle in spaced relation to the chuck. A spacing sleeve 22, is shown mounted on the spindle 15 between the bearing members 17 and 18, for maintaining the bearing member 17 in fixed spaced relation to the bearing member 18. It will thus be observed that the nut 21, sleeve 22, and chuck 20 coact to clamp the spindle 15 and bearing members 17 and 18 to each other, so that the spindle may rotate in the bearing member but is maintained against axial movement with respect to said bearing member.

The bearing members 17 and 18 are mounted in a supporting sleeve or quill 24, which in turn is slidably mounted for longitudinal reciprocative movement in a tubular bearing member 25 mounted in the lower end portion 14 of the housing 11. The supporting sleeve or quill 24 is maintained against rotary movement with respect to the bearing 25 and housing 11 by means of a clamp block or key 26 positioned in an elongated slot 27 formed in the outer peripheral surface of the quill 24, said block being rotatably connected with the inner end of a screw 28 which is screw threaded in the bearing member 25 near the lower end thereof and extends outwardly from said bearing member through a suitable aperture 29 provided in the adjacent portion of the housing 11. The outer end of the screw member 28 may, as shown, be provided with a knurled head 28' forming a finger piece by which the screw may be readily rotated. The object of rotating the screw member 28, is to bring the clamping block 26 into clamping engagement with the quill 24 for releasably locking the quill against axial movement when it is desired to maintain the tool carried by the spindle 15 in predetermined relation with the work, as for instance, when cutting a slot of required depth across the face of a piece of work with a milling tool.

The quill 24 is moved axially to bring the tool carried by the spindle 15 into and out of engagement with the work by means of a worm nut 31, which is rotatably mounted in the housing 11 between the upper end of the bearing 25 and a thrust bearing 32, bearing 32 being mounted in the housing 11, in inward spaced relation to the bearing 25. The nut 31 is provided with internal screw threads which are in engagement with a lead-screw 33 formed in the outer peripheral surface of the quill 24 at the inner end portion thereof. A worm gear 34 mounted upon or made integral with a shaft 35, is in meshing engagement with suitable worm gear teeth 36, provided on the outer peripheral surface of the nut 31 for producing rotation of said nut. The shaft 35 in this instance extends through the housing 11 at one side of the bearing member 25 adjacent the inner end thereof and is rotatably mounted in suitable bearings 38, mounted in said housing at opposite ends of the worm 34, as shown in Figure 2. Thrust bearings 39 may, as shown, be mounted on the shaft 35 between the ends of the worm 34 and the adjacent bearings 38.

The shaft 35 has both ends thereof extended beyond the adjacent portion of the housing 11 for receiving the hand wheel 40 by which the shaft and gear 34 may be manually rotated. The hand wheel 40 is preferably releasably secured to the shaft 35 so that it may be readily shifted from one end of the shaft to the other to position the wheel most advantageously for rotating the shaft 35. It will now be observed that rotation of the shaft 35 in one direction will rotate the nut 31 for producing axial movement of the quill 24 and the spindle carried thereby, in a corresponding direction while reverse rotation of shaft 35 will produce movement of the quill and spindle in the opposite direction.

The axial movement of the quill and spindle is for the purpose of moving the tool carried by the spindle into and out of operative engagement with a piece of work supported in co-operative relation therewith, and any suitable power means may be connected with the spindle 15 for rotating the same and the tool carried thereby. For this purpose, I have shown a multiple speed pulley 42 mounted in the housing 11, at the inner end of the quill 24. The pulley 42 is journaled in suitable bearings, one of which is shown at 43, Figure 3, mounted in the housing 11 adjacent the ends of the pulley. Suitable means, such as an electrical motor, not shown, may be connected with the pulley 42 by a suitable belt, also not shown, for driving said pulley. The pulley 42 is splined to the spindle 15 by a key, whereby the spindle may be caused to rotate with pulley 42 and at the same time said spindle is free to move axially through the pulley during the adjustment of the spindle for bringing the tool into and out of operative engagement with the work.

The device thus far described is of conventional structure, and the means for registering the axial movement of the spindle 15 whereby the position of the tool with respect to the work to be engaged thereby may be determined and which constitutes the novel features of the invention will now be described.

This position indicating means comprises a mechanical counter 46 which is shown mounted on the housing 11 by screws 47 in close proximity to and in substantially parallel relation with the worm shaft 35. This counter 46 is of the multiple register wheel type having mechanical connections (not shown and which may be of any suitable well known construction) between the register wheels, as 49, for periodically transmitting motion from a wheel of one denomination to an adjacent wheel of another denomination and a rotatable drive shaft 52 operatively connected with one of said shaft register wheels. This counter as indicated more particularly in Figure 5, is provided with five register wheels 49 which may be observed through a window 50 provided in a casing 51 for the wheels. The rotatable drive shaft 52 is journaled in one end of the case 51 and this shaft is operatively connected by suitable mechanism not believed necessary to illustrate or further describe, with the register wheel 49 adjacent said end for rotating said wheel in either direction.

The counter shown is known as a Direct Drive Counter which counts ten units, which in this instance represents ten one-thousandths of an inch, for each revolution of the shaft 52. The opposite end of the case 51 is provided with a reset shaft 54, which has secured to the outer end thereof a wing knob 55. The other or inner end of shaft 54 is connected with a clutch element, indicated at 56, adapted upon inward axial movement of the shaft 54 to engage a companion clutch element, indicated at 57, which is operatively connected in any suitable manner with the record wheels 49 for resetting said wheels to zero reading. A spring, indicated at 58, may be positioned between the clutch element 56 and 57 for normally maintaining said elements out of engagement with each other so that the shaft 54 and wing knob 55 will remain stationary during the normal operation of the register wheels 49.

In order that the counter 46 may be operated in predetermined relation with the axial movement of the quill 24 and spindle 15, I have mounted a small spur gear 60 upon the outer end of the drive shaft 52 in fixed relation therewith. A spur gear 61 is secured on one end of the worm shaft 35 in the plane of the spur gear 60. The gears 60 and 61 are operatively connected with each other by a clutch element which, in this instance, is an idle gear 62, which is rotatably mounted upon a pin or stud 63 secured to the housing 11 by a boss 64 and screw 65, as shown in Figure 5. The idle gear 62 is slidably mounted upon the stud 63 so as to move from an operative position in meshing engagement with gears 60 and 61 to an inoperative position out of meshing engagement with said gears. In order that the idle gear 62 may be releasably maintained in either the operative or the inoperative position, I have provided the hub 66 of the gear with a spring pressed ball 67 which is adapted to travel in either of two annular grooves 68 formed in the peripheral surface of the stud 63 in axial spaced relation to each other. The hub 66 of the gear 62 may, as shown in Figures 2 and 5, be provided with an outward extending annular flange 66' adjacent the outer end thereof to form a finger piece by which the gear may be manually moved axially into and out of engagement with the gears 60 and 61. The relations of the gears 60 and 61 to each other and to the worm 34 and the worm gear teeth 36 and to the lead-screw 33, are such that each one-thousandths of an inch of axial movement of the quill 24 and therefore of the spindle 15 and the tool carried by said spindle will produce one-tenth of a revolution of the counter drive shaft so that said measurement will be registered in counter 46.

The operation of the counter in connection with the tool positioning mechanism comprising worm 34, gear 36, and lead-screw 33 will be now understood to be substantially as follows:

Assuming that it is desired to drill a hole in a piece of work, as W, mounted upon a table or support, as S, of the machine arranged beneath the housing 11. The drill or tool, as T, secured to the spindle 15 by the chuck 20 will be normally maintained in its uppermost position, as shown in Figures 1 and 3, for permitting the work W to be readily mounted on the support S. After the work has been mounted on the support the tool may be moved downwardly by rotation of the shaft 35 until the lower end of the tool contacts with the upper surface of the work, at which position of the tool the counter 46 will be set to zero by manipulation of the resetting shaft 54. This is accomplished by pressing the shaft inwardly against the action of the spring 58 to bring the clutch elements 56 and 57 into engagement with each other and then rotating said shaft by means of the finger knob 55 in one direction or the other until the counter is reset to zero. As the knob is released by the operator the spring 58 will return the shaft 54 to its outermost position, thereby disengaging the clutch element 56 from the clutch element 57. It will now be observed that further downward axial movement of the spindle 15 and the drill T carried thereby will be accurately registered in the counter 46 and the operator may readily determine when he has produced a hole of the required depth by merely reading the counter.

When the hole of the require depth has been formed the drill will be returned to its extreme uppermost inoperative position by the operator rotating the shaft 35 in the proper direction through the medium of the hand wheel 40. This return of the tool to the operative position will, of course, cause the register wheels 49 of the counter to be rotated backward, so that, when the tool is in the inoperative position, the counter will register an amount which will depend upon the distance the tool has moved from the initial operative position where the counter was set at zero. This amount showing on the counter will not, however, correctly indicate the distance the tool traveled from the initial operative position and the zero setting of the counter owing to the register wheels being moved backwardly and the figures on said wheels appearing through the window in successive decreasing values. In other words the counter only registers the amount which will indicate the depth of the hole to be made by the drill or other work to be done by the tool mounted in the chuck 20 when such work is performed. It therefore follows that when the tool is moved downwardly into engagement with the work the operator may readily determine when the tool has moved a distance sufficient to perform its required function by reading the counter and without the necessity of calculation on his part, as is often necessary with conventional tool positioning indicator devices such as a dial.

Although the construction and operation of the device shown and described are particularly simple, practical and efficient, I do not wish to be limited to the exact details thereof, as it is evident that various changes may be made therein without departing from the spirit of the invention as set forth in the appended claims.

I claim:

1. In a machine of the class described having a rotatable tool supporting spindle mounted in a case for axial movement with respect to said case toward and from a work support, positioning mechanism including a shaft operatively connected with said spindle and rotatably mounted in said case; said shaft being extended outwardly at one end beyond said case and having handle means connected therewith whereby the shaft may be manually rotated, means for indicating the position of the tool with respect to the work including a mechanical counter of the multiple register wheel type having mechanical connections between the wheels for periodically transmitting motion from a wheel of one denomination to an adjacent wheel of another denomination and a rotatable drive shaft operatively connected with one of said register wheels, means operatively connecting the mechanical counter to the case in close proximity to the first mentioned shaft, and means operatively connecting the shaft of said positioning mechanism with the drive shaft of said counter for actuating said latter shaft in predetermined relation to said axial movement of the spindle including a pair of gear members, one of said gear members being mounted on the shaft of the positioning mechanism intermediate the handle and said case, the other one of said pair of gears being fixedly secured to the drive shaft of the mechanical counter, and an idler gear rotatably connected with the case in meshing engagement with said pair of gear members.

2. A structure as in claim 1 wherein said idler gear is connected with the case for movement with respect thereto into and out of engagement with said gear members, and means connected with said idler gear for producing said movement thereof.

WILLIAM L. MacRAE.